(12) United States Patent
Rana et al.

(10) Patent No.: US 12,253,930 B2
(45) Date of Patent: Mar. 18, 2025

(54) DYNAMIC ADAPTIVE THREADING USING IDLE TIME ANALYSIS

(71) Applicant: International Business Machines Corporation, Armonk, NY (US)

(72) Inventors: Salman Zia Rana, Ottawa (CA); Aleksandar Micic, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 637 days.

(21) Appl. No.: 17/504,664

(22) Filed: Oct. 19, 2021

(65) Prior Publication Data

US 2023/0122295 A1 Apr. 20, 2023

(51) Int. Cl.
*G06F 11/34* (2006.01)
*G06F 9/48* (2006.01)

(52) U.S. Cl.
CPC ........ *G06F 11/3414* (2013.01); *G06F 9/4881* (2013.01)

(58) Field of Classification Search
None
See application file for complete search history.

(56) References Cited

U.S. PATENT DOCUMENTS

| | | |
|---|---|---|
| 7,237,242 B2 | 6/2007 | Blythe et al. |
| 7,681,196 B2 | 3/2010 | Vedula |
| 8,185,906 B2 | 5/2012 | Muscarella |
| 8,234,648 B1 * | 7/2012 | Joyce ............ G06F 9/451 718/102 |
| 8,296,454 B2 | 10/2012 | Youn et al. |
| 8,381,216 B2 | 2/2013 | Gowda |

(Continued)

FOREIGN PATENT DOCUMENTS

| | | |
|---|---|---|
| CN | 112000455 A | 11/2020 |
| WO | 2016048831 A1 | 3/2016 |
| WO | 2019132330 A1 | 7/2019 |

OTHER PUBLICATIONS

Costa et al.; "Adapt-T: An Adaptive Algorithm for Auto-Tuning Worker Thread Pool Size in Application Servers"; IEEE 2019 (ISCC); (NPL: Costa_2019.pdf; pp. 1-6) (Year: 2019).*

(Continued)

*Primary Examiner* — Hiren P Patel
(74) *Attorney, Agent, or Firm* — Garg Law Firm, PLLC; Rakesh Garg; Michael O'Keefe

(57) ABSTRACT

An embodiment includes initiating a first cycle of a process using a first number of threads that operate in parallel to collectively execute the process and collect performance data. The embodiment aggregates the performance data and computes a first idle duration based at least in part on the aggregated performance data. The embodiment projects a thread-count recommendation based at least in part on a mathematical model that includes the first number of threads as an input number of threads, the first idle and cycle durations as input idle and cycle durations, respectively, and a second number of threads as an output variable representative of an output number of threads, where the output number of threads is determined as a function of the input idle duration. The embodiment initiates a second cycle of the process using the second number of threads output as a projection by the mathematical model.

20 Claims, 10 Drawing Sheets

(56) References Cited

U.S. PATENT DOCUMENTS

| | | |
|---|---|---|
| 8,387,059 B2 | 2/2013 | Chang et al. |
| 8,429,656 B1 | 4/2013 | Duluk, Jr. et al. |
| 8,495,650 B2 | 7/2013 | Raspl et al. |
| 8,677,360 B2* | 3/2014 | de Justo Teixeira ........................ G06F 11/3476 718/100 |
| 9,043,802 B2 | 5/2015 | Nadathur et al. |
| 9,354,931 B1* | 5/2016 | Ryoo .................... G06F 9/5061 |
| 11,573,833 B2* | 2/2023 | Krasner ................ G06F 9/5027 |
| 11,604,704 B2* | 3/2023 | Jiang .................... G06F 9/5027 |
| 2005/0086359 A1* | 4/2005 | Banerjee ............... G06F 9/5027 709/232 |
| 2006/0107261 A1* | 5/2006 | Vedula .................. G06F 9/5027 718/100 |
| 2008/0033900 A1* | 2/2008 | Zhang ................... G06N 5/048 706/52 |
| 2008/0147357 A1* | 6/2008 | Truter ................. G06F 11/3423 702/186 |
| 2008/0295107 A1* | 11/2008 | Muscarella ........... G06F 9/5027 718/104 |
| 2012/0166498 A1 | 6/2012 | Gracie et al. |
| 2014/0143789 A1* | 5/2014 | Nadathur .............. G06F 9/5088 718/105 |
| 2016/0110217 A1* | 4/2016 | Sreedharan ............. G06F 8/314 718/102 |
| 2018/0217927 A1 | 8/2018 | Stephens et al. |
| 2018/0307417 A1 | 10/2018 | Dubeyko et al. |
| 2019/0043158 A1* | 2/2019 | Levit-Gurevich ........ G06T 1/20 |
| 2019/0196874 A1* | 6/2019 | Nagaswamy ......... G06F 9/4893 |
| 2020/0387322 A1 | 12/2020 | Horie et al. |

OTHER PUBLICATIONS

Park et al., Mark-Sharing: A Parallel Garbage Collection Algorithm for Low Synchronization Overhead, 2013 International Conference on Parallel and Distributed Systems, Dec. 15-18, 2013.

Cochran et al., Identifying the optimal energy-efficient operating points of parallel workloads, 2011 IEEE/ACM International Conference on Computer-Aided Design (ICCAD), Nov. 7-10, 2011.

Model: Dynamically Adjusting Threads for Heterogeneous Many-Core Systems, on Parallel and Distributed Systems (ICPADS), Dec. 14-17, 2015.

Ju et al., Thread Count Prediction Model: Dynamically Adjusting Threads for Heterogeneous Many-Core Systems, 2015 IEEE 21st International Conference on Parallel and Distributed Systems (ICPADS), Dec. 14-17, 2015.

* cited by examiner

DYNAMIC ADAPTIVE THREADING USING IDLE TIME ANALYSIS

BACKGROUND

The present invention relates generally to a method, system, and computer program product for multi-threaded processes. More particularly, the present invention relates to a method, system, and computer program product for dynamic adaptive threading using idle time analysis.

Modern computing devices include traditional platforms, such as laptops, rack servers, as well as more contemporary devices, such as smart phones, tablets, and Internet-of-Things (IoT) devices. IoT devices include a growing expanse of computing devices, including a variety of appliances, vehicles, fitness/healthcare equipment, home automation devices, and many other categories of devices. Despite the variety in implementations and platforms, these devices all share a basic architecture of components that include a processor (sometimes referred to as a Central Processing Unit (CPU)), computer-readable memory, software instructions stored in the memory and performed by the processor, and a network interface that allows the device to communicate across a computer network.

There are many different types of each of these components that may be used to implement this basic architecture. For example, there are numerous types of processors that may be classified into groups based on such things as registry size (e.g., 32 bit or 64 bit) or number of independently operating processing units, referred to as cores (e.g., single core, dual core, or quad core). Processors that include multiple cores are able to perform multiple sub-processes in parallel as threads of execution, or simply "threads." This allows the processor to execute multiple commands from a software-based process at the same time. This technique is sometimes referred to as "multithreading."

SUMMARY

The illustrative embodiments provide for dynamic threading using idle time analysis. An embodiment includes initiating a first cycle of a process using a first number of threads, where the first number of threads operate in parallel during the first cycle to collectively execute the process, and where each of the first number of threads collects performance data during the first cycle. The embodiment also includes aggregating the performance data collected during the first cycle by each of the first number of threads. The embodiment also includes computing a first idle duration based at least in part on the thus aggregated performance data. The embodiment also includes projecting a thread-count recommendation based at least in part on a mathematical model that includes the first number of threads as an input number of threads, the first idle and cycle durations as input idle and cycle durations, respectively, to the mathematical model and a second number of threads as an output variable of the mathematical model, where the output variable is representative of an output number of threads, and where the output number of threads is determined as a function of the input idle duration using the mathematical model. The embodiment also includes initiating a second cycle of the process using the second number of threads projected by the mathematical model as the output number of threads, where the second number of threads operate in parallel during the second cycle to collectively execute the process. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
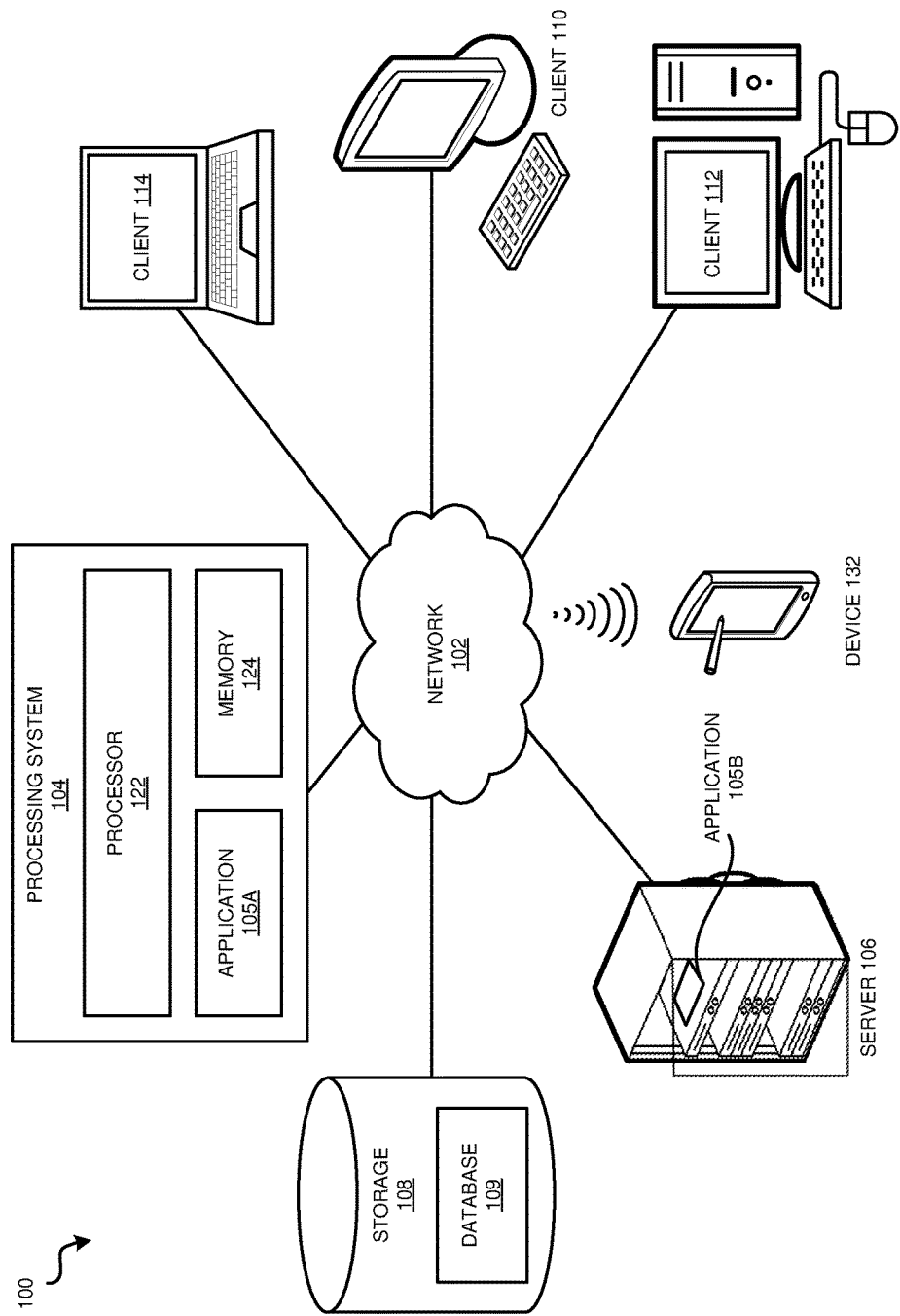
FIG. 1 depicts a block diagram of a network of data processing systems in which illustrative embodiments may be implemented.

The wide array of computing devices available today offers users an unprecedented degree of variety in device functionality as traditional devices continue to be improved and innovative devices continue to be introduced. However, acceptance and adoption of such technologies is dependent on user interest in the offered functionality as well as user satisfaction with how well devices provide the offered functionality. Product design involves a constant challenge to produce devices that satisfy several computer performance metrics, such as response time and latency. On the other hand, the cost involved in manufacturing a device is important as well, and cost considerations often require compromises for design decisions that affect performance. As a result, there is an ongoing interest in improving the efficiency of device components in order to improve performance without excessive increases in expense.

The introduction of multithreading capabilities enabled by multi-core processors is one example of a performance improvement because the processor's ability to perform multiple subprocesses in parallel reduces the overall time needed for the processor to complete overall execution. Thus, with multithreading, a software execution (e.g., task or processes) can be divided and distributed to multiple threads to share in completing it, thereby reducing the overall time needed to complete the software execution. There are several types of multithreading, such as coarse-grained multithreading, interleaved multithreading, and techniques sometimes referred to as parallelism or multi-processing. However, for the sake of simplicity, all of these techniques are simply referred to herein as multithreading.

In ideal situations, multithreading provides significant performance benefits, but the performance improvements can come at a cost. For example, there may be overhead associated with multithreading tasks that has been overlooked and unaccounted for. There are several reasons for this overhead, such as those that are a result of additional requirements needed with multithreading to synchronize (critical sections and accessing global resources) and manage (dispatch and suspend) threads. In general, multithreading overhead is any time cost that is incurred from utilizing a plurality of threads to perform a task. This overhead can be significant as it increases proportionally with the number of threads utilized.

In ideal situations, multithreading provides more performance benefits than overhead. However, this is not always the case. For example, there may not be enough work to be distributed across the utilized threads. This is common with light workloads (with total execution times usually in the range of microseconds to few milliseconds) as they have a limited amount of work to be divided amongst plural threads, thus leaving some threads underutilized and incurring overhead. Furthermore, depending on the workload and process characteristics, some processes may be effectively multithreaded only up to a certain number of threads. As a result, there may be an imbalanced distribution of workload when too many threads are utilized. In these cases, threads are left idle, yet they must still participate (i.e., be managed) and go through the steps of the process (e.g., to reach synchronization points). With this type of multithreading, it is possible to incur overhead without gaining any benefit. Overall, unless the benefits of multithreading are greater than the overhead incurred, multithreading will be detrimental and cause process times to increase unnecessarily.

In addition to the scenarios described, effectiveness of multithreading may be limited by high CPU utilization. This is true, for example, for a system running multiple Java Virtual Machines (JVMs)(Java is a registered trademark of Oracle America, Inc.). In this case, system threads can be shared among different JVMs and thus among different JVM processes. A non-limiting example of a multithreaded JVM process is garbage collection (GC). With multiple JVMs, GC progress will depend on availability of threads. For instance, with two JVMs running GCs simultaneously, it is possible to have a set of threads scheduled to one JVM and another set schedule to the other. This can be an issue as either GC may require the other's set of threads before clearing a synchronization point, or a thread may be halted and reschedule (to other JVM) while in the middle of processing work. Overall, such a thread will be limiting GC progression and it can be said that the thread provides ineffective multithreading. Furthermore, there is a cost of context switching when threads are rescheduled between JVMs that can have an impact on GC performance. Overall, multithreading can be detrimental in cases where utilized threads are shared and made unavailable.

In general, multithreading is most beneficial when done with a proper number of threads (i.e., considered as an optimal number of threads). Too many threads results in unnecessary overhead that exceeds performance gains (referred to as detrimental multithreading), whereas too few threads leave room for improved performance (referred to as sub-optimal multithreading). The point at which a system reaches peak performance can be referred to as the equilibrium point. At this point, work is optimally distributed for all of the utilized threads (e.g., threads are evenly allocated between JVMs for multi-JVM scenarios) and the overhead is minimal while benefits are maximized.

For the sake of clarity, embodiments may be described herein in connection with GC processes with the understanding that the present disclosure is equally applicable to numerous other types of processes. For a GC process, the default procedure is to reserve all available system threads for GC. This means a large system will utilize more threads when compared to a smaller system to complete the same task. Intuitively, this may seem to be effective because it may be assumed that the larger system is more powerful and has more resources (e.g., a 48-core system vs. a 4-core system). However, in some cases, the larger system may incur decreases in performance due to the effects of detrimental multithreading discussed above. Additionally, in a multi-JVM scenario, reserving all system threads has further implications as the same set of threads will be reserved for each running JVM. As more threads are shared, the effectiveness of multithreading decreases since more threads can become unavailable and limit GC progression. Hence, the present disclosure recognizes that defaulting to use all available computing resources (all the available threads) is less than optimal in some cases.

The problem with multithreading overhead is illustrated in Tables 1 and 2 below. Table 1 shows a comparison of a same workload running with forty-eight threads, eight threads and four threads:

TABLE 1

| Threads | Score | Average Cycle Times |
|---|---|---|
| 48 | 222,567 | 1.60 ms |
| 8 | 255,611 | 0.60 ms |
| 4 | 261,737 | 0.35 ms |

It can be seen in Table 1 that as GC threads are decreased (decreased multithreading), average cycle times are decreased and, as a result, performance scores are increased. In another example illustrated in Table 2 below, peak performance is obtained when eight threads are utilized:

TABLE 2

| Threads | Score |
|---|---|
| 48 | 80,543 |
| 8 | 93,824 |
| 4 | 91,166 |

It can be seen in Table 2 that with forty-eight threads, the process incurs too much overhead, while with four threads the process still has the opportunity to further parallelize the task with more threads and gain performance benefits. In other words, with forty-eight threads the process incurs detrimental multithreading, whereas with four threads the process incurs sub-optimal multithreading. These examples illustrate that there is a point of equilibrium that results in peak performance. For the workload measured in Table 2, the process obtains peak performance at approximately eight threads, and for the workload measured in Table 1, the process obtains peak performance at around 4 threads. Thus, existing systems and methods that always allocate the maximum number of available threads will at times use too many threads, and therefore will incur overhead that consumes more time than is gained by the use of the excessive number of threads.

Aspects of the disclosure address this and other deficiencies above by providing mechanisms (e.g., systems, methods, machine-readable media, etc.) that automatically adjust a number of threads of execution that operate in parallel to collectively execute a computer process based on performance data collected during an earlier process cycle. In some embodiments, the mechanisms automatically aggregate and analyze the collected performance data. Based on this analysis, the mechanisms project a more optimal thread count for a subsequent cycle of the process. In some embodiments, the mechanisms detect detrimental multithreading when the thread count was too high during the earlier process cycle and detect sub-optimal multithreading when the thread count was too low during the earlier process cycle. If the mechanisms detect detrimental multithreading, the mechanisms project that a lower thread count will be more optimal (i.e., complete the process cycle more quickly) for a subsequent cycle of the process. On the other hand, if the mechanisms detect sub-optimal multithreading, the mechanisms project that a higher thread count will be more optimal (i.e., complete the process cycle more quickly) for a subsequent cycle of the process. As a result, the disclosed embodiments provide for mechanisms that easily adapt to a variety of bases for sub-optimal computer processes and automatically or semi-automatically make thread-count adjustments to improve process performance.

In some embodiments, the mechanisms automatically aggregate and analyze the collected performance data and automatically project a more optimal thread count for a subsequent cycle of the process without requiring user input or any other user action. In some such embodiments, the mechanisms project the more optimal thread count using parameters that are based on stored default values or are determined using a machine learning process. In alternative embodiments, the mechanisms automatically aggregate and analyze the collected performance data and semi-automatically project a more optimal thread count for a subsequent cycle of the process by allowing a user to input certain parameters used to project the more optimal thread count or allowing a user to adjust one or more settings that the mechanisms use as a basis for certain parameters used to project the more optimal thread count.

In some embodiments, the mechanisms project the more optimal thread count using a calculation that includes a weighting factor that affects a difference between the number of threads used for the earlier process cycle and the projected optimal thread count. In some such embodiments, the mechanisms determine a weighting parameter for the weighting factor using a machine learning algorithm that is trained based on features of the performance data to predict the weighting parameter. The mechanisms determine the weighting parameter by executing the trained machine learning algorithm using the performance data collected during a most recent cycle of a process to predict a weighting parameter for projecting a more optimal thread count for the next cycle of the process.

In some embodiments, the mechanisms project the more optimal thread count using a calculation that includes a boosting factor that affects a proportionality between the number of threads used for the earlier process cycle and the difference between the number of threads used for the earlier process cycle and the projected optimal thread count. In some such embodiments, the mechanisms determine a boosting parameter for the boosting factor using a machine learning algorithm that is trained based on features of the performance data to predict the boosting parameter. The mechanisms determine the boosting parameter by executing the trained machine learning algorithm using the performance data collected during a most recent cycle of a process to predict a boosting parameter for projecting a more optimal thread count for the next cycle of the process.

In some embodiments, the mechanisms project the more optimal thread count using a calculation that includes a sensitivity factor that affects the projected optimal thread count based on one or more platform-specific characteristics and/or the type of process being performed. For example, the sensitivity factor may include a sensitivity parameter that can be adjusted based on application- or platform-specific behavioral characteristics that determine stall dependency on GC thread count. For instance, if stall times are known to have a non-linear dependency on GC thread count, then this parameter can be adjusted accordingly. A smaller value (0.9) can be tried when the dependency between stall time and thread count is not as significant, which can be true for platforms that have optimizations in place for multithreading. On the other hand, a larger value (1.2) can be used where there is a greater dependency between stall and GC thread count, allowing for more aggressive adjustments to be tried for the same stall value.

In some embodiments, the mechanisms automatically aggregate and analyze collected performance data that includes data indicative of various forms of idle durations. While idle duration may technically be distinguishable from stall duration or other non-productive periods of time, for the sake of simplicity, such periods of time are collectively referred to herein as idle times or idle duration. Thus, an idle duration, as used herein, refers to an amount of time a thread is not engaged in performing some action related to its assigned process, including times when the thread is completely idle (i.e., not doing any work) and including stall times during which the thread may instead be performing non-useful or trivial work. For example, when a thread of a GC process exhausts all work from its scan cache, it may attempt to acquire more work from a global work queue. If there is no work available, the thread will go completely idle until it is notified of more work. Idle duration, as used herein, includes time measurements for things such as:

Push/pop something to/from a shared global list (e.g., scan list)

Acquire synchronization monitor (contention)

Idle at a synchronization point

Idle waiting for work

Wake up from idleness and start running

Notify idle threads (the time it takes for a thread to notify idle threads)

Notable exceptions to this definition of idle time are those periods of time during which a thread is performing some action for which it is not possible or not worth parallelizing, so that thread alone performs this action while other threads wait until the action is completed. These periods of time are referred to as thread-count insensitive periods (or thread-count insensitive durations). In some embodiments, thread-count insensitive periods are discarded before projecting a more optimal thread count.

In some embodiments, the mechanisms automatically aggregate and analyze collected performance data that includes data indicative of various forms of busy durations and overall cycle duration. Continuing with the example of a GC process, examples of busy duration include time a thread is performing useful GC work that contributes to completing the GC process cycle. In such embodiments, busy time includes measure for things such as:

Root processing
Scanning objects
Remembered set processing
Copying or marking objects In some embodiments, the mechanisms aggregate the idle duration and busy duration times from performance data collected by the threads during the process cycle. For example, in some embodiments, the performance data includes time stamps indicating when various actions or periods of inactivity take place, so busy and idle durations are determined by calculating time periods between these recorded time stamps, and then averaging the total busy time periods of each thread to arrive at a final busy duration and averaging the total idle time periods of each thread to arrive at a final idle duration. In some embodiments, the data aggregation is simplified by ignoring time periods in the performance data during which the threads were busy, and instead collecting only idle duration and overall cycle duration. Thus, in such embodiments, the aggregating of the performance data includes calculating a total idle time period for each thread by summing the idle time periods of each thread, and then calculating the idle duration as an average of the total idle time periods of all of the threads as indicated by Expressions 1 and 2:

$$\text{Total Idle Time}_i = \text{Idle Period}_1 + \ldots + \text{Idle Period}_j \quad (1)$$

$$\text{Idle Duration} = (\Sigma \text{Total Idle Time}_{1\ldots n})/n \quad (2)$$

In Expressions 1 and 2, Total Idle Time$_i$ is calculated as the sum of each of the Idle Periods 1 to j for thread$_i$, thread$_i$ has j total idle periods, and where j may vary for each thread. Then, the Idle Duration in Expression 2 is the average of the Total Idle Times$_{1\ldots n}$ for each thread$_i$, i where i=1 to n for n total threads. In some such embodiments, the aggregating of the performance data includes iterating over data collected by each of the threads, calculating respective individual idle times for each of the threads, and calculating the idle duration as an average of the individual idle times of the threads.

In some embodiments, instead of calculating the busy duration from the time intervals in the performance data, the mechanisms instead calculate the busy duration using an overall cycle duration. The overall cycle duration is the total amount of time required for the threads to collectively perform the process cycle. Thus, in such embodiments, the mechanisms calculate the busy duration as the difference between the overall cycle duration and the idle duration as indicated by Expressions 3 and 4:

$$\text{Overall Cycle Duration} = \text{Busy Duration} + \text{Idle Duration} \quad (3)$$

$$\text{Busy Duration} = \text{Overall Cycle Duration} - \text{Idle Duration} \quad (4)$$

As discussed above, in some embodiments the mechanisms discard the thread-count insensitive periods (or thread-count insensitive durations) before projecting a more optimal thread count. The thread-count insensitive periods are defined as being excluded from Idle Duration, but are still included in the Overall Cycle Duration. Therefore, in some embodiments, an Overall Cycle Duration$T$ is defined as a Total Overall Cycle Duration that is a sum of an Overall Cycle Duration$S$ that is sensitive to thread count and an Overall Cycle Duration$I$ that is insensitive to thread count as shown as Expression 5, allowing for an alternative calculation for determining Busy Time that is shown as Expressions 6 and 7:

$$\text{Overall Cycle Duration}_T = \text{Overall Cycle Duration}_S + \text{Overall Cycle Duration}_I \quad (5)$$

$$\text{Overall Cycle Duration}_S = \text{Busy Duration} + \text{Idle Duration} \quad (6)$$

$$\text{Busy Duration} = \text{Overall Cycle Duration}_S - \text{Idle Duration} \quad (7)$$

In some embodiments, the mechanisms automatically analyze the aggregated performance data using a mathematical model that includes the idle duration from the most recent process cycle as an input idle duration to the mathematical model and a revised thread count as an output variable of the mathematical model. In some such embodiments, the output variable is representative of an output number of threads, the output number of threads is determined as a function of the input idle duration using the mathematical model. In some embodiments, the mathematical model includes a weighting factor that affects a difference between the number of threads used for the most recent process cycle and the output number of threads. In some embodiments, the mathematical model includes a boosting factor that affects a proportionality between the number of threads used for the most recent process cycle and the difference between the number of threads used for the most recent process cycle and the output number of threads. In some embodiments, the mathematical model includes a sensitivity factor that affects the output number of threads based on one or more platform-specific characteristics. For example, in some such embodiments, the platform-specific characteristic affects idle time for threads of a garbage collection process. In some embodiments, the mathematical model further includes an overall cycle duration from the most recent process cycle as an input cycle duration to the mathematical model and includes the number of threads from the most recent process cycle as an input number of threads to the mathematical model. In some such embodiments, the output number of threads is determined by the mathematical model as a function of the input idle duration, the input cycle duration, and the input number of threads.

In some embodiments, the mechanisms initiate a process cycle according to an initiation process that includes specifying a number of threads for performing the process. In some embodiments, the mechanisms issue a query to a data storage for a thread-count recommendation determined as disclosed herein as a more optimal thread count. In some such embodiments, if the query returns an indication of the thread-count recommendation being available, the query response will include the thread-count recommendation, in which case the mechanisms will then request the recommended number of threads for performing the process cycle. On the other hand, if the query returns an indication of the thread-count recommendation being unavailable, the mechanisms will then request a default number of threads instead. In some such embodiments, the default number of threads is a predetermined number of threads or a predetermined percentage of available threads. For example, in some embodiments, if such a thread-count recommendation is not available, the mechanisms request all available threads (i.e., 100% of available threads).

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
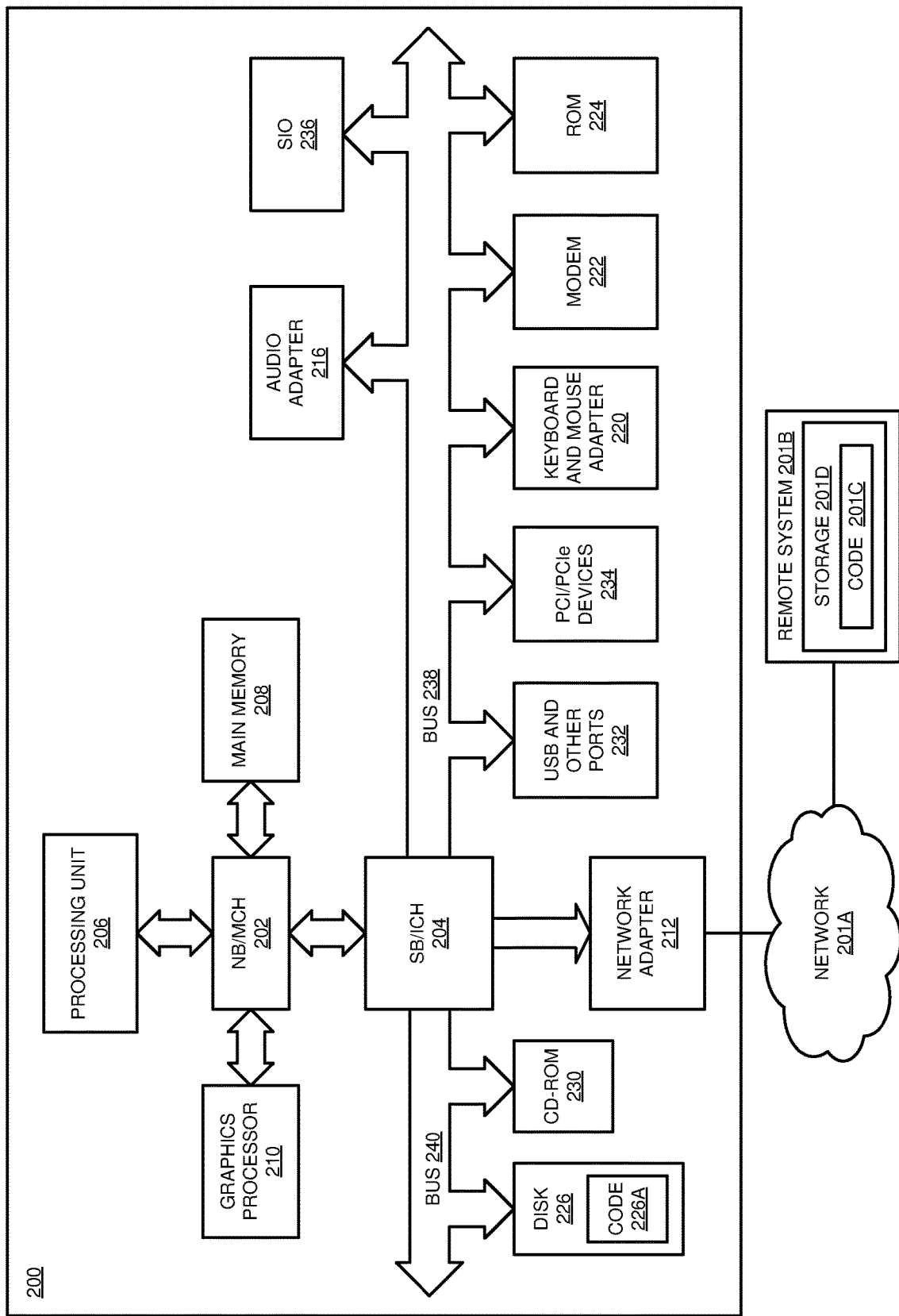
FIG. 2 depicts a block diagram of a data processing system in which illustrative embodiments may be implemented.

FIGS. 1 and 2 show example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
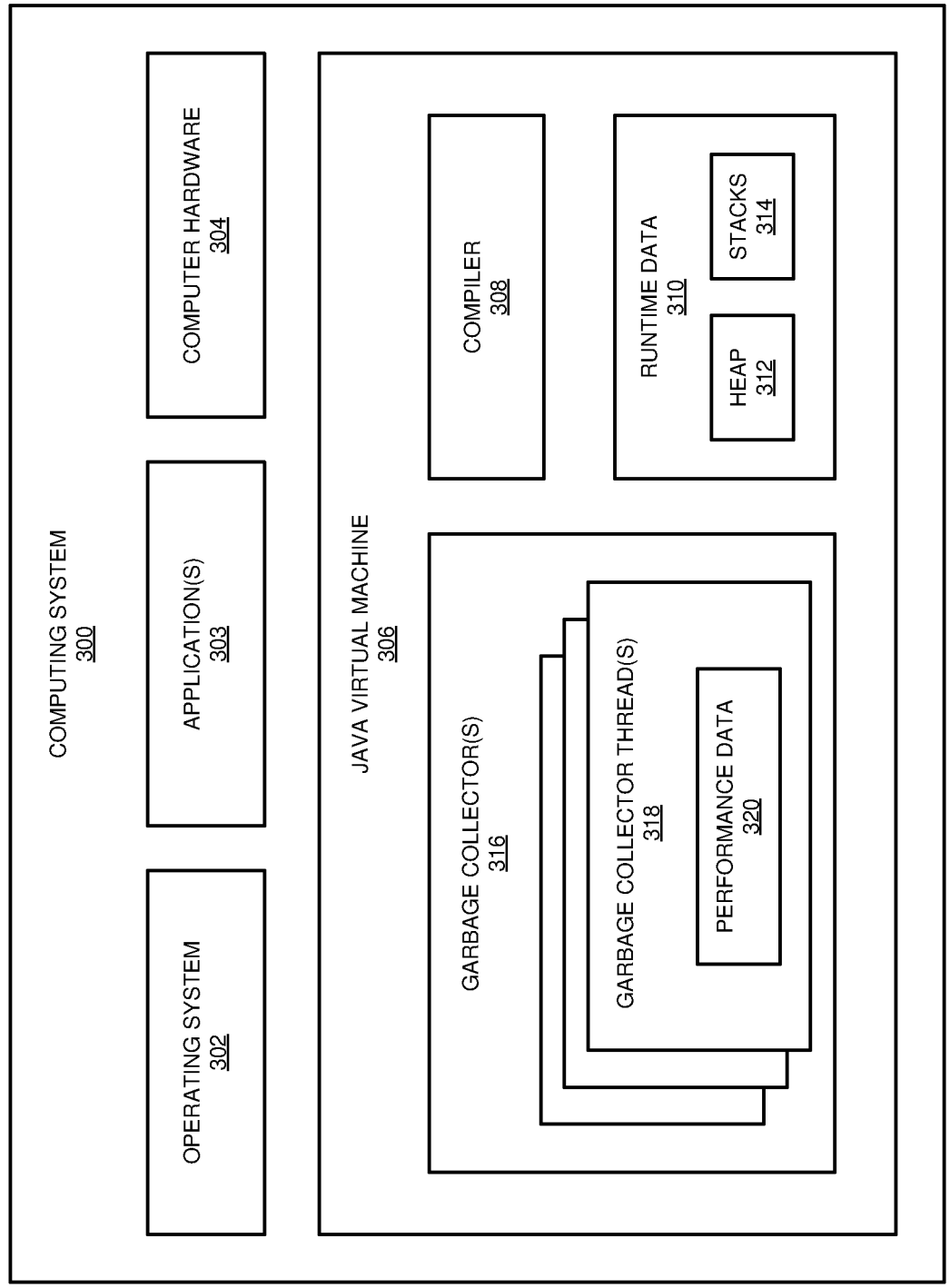
FIG. 3 depicts a block diagram of an example computing system in accordance with an illustrative embodiment.

With reference to FIG. 3, this figure depicts a block diagram of an example computing system 300 in accordance with an illustrative embodiment. The example embodiment includes a Java virtual machine (JVM) 306 that includes a compiler 308 and runtime data 310 that perform enhanced compiler optimizations according to embodiments disclosed herein. While embodiments are described in connection with a JVM as a non-limiting example, the disclosed concepts are not so limited. Instead, those skilled in the art will appreciate that the disclosed concepts are equally applicable to a wide variety of cyclic or reoccurring processes. Embodiments of the JVM 306 perform processes according to the flowcharts shown in FIGS. 8-10. In an embodiment, the virtual machine 306 is an example of application 105A/105B of FIG. 1.

In some embodiments, the computing system 300 includes an operating system 302 running one or more applications 303 on computer hardware 304. In some embodiments, the applications 303 include Java applications. In some such embodiments, the operating system 302 provides an operating environment for Java applications run by the JVM 306. In some embodiments, the JVM 306 includes a compiler 308 that receives bytecode and translates it into a Java application using runtime data 310. The runtime data includes heap memory 312, stacks memory 314, and one or more garbage collector(s) 316. In some embodiments, the garbage collector(s) 316 use one or more garbage collector thread(s) 318 to perform a series of multithreaded process cycles. The garbage collector thread(s) 318 each collect performance data 320 during each cycle. In some embodiments, the performance data 320 includes data indicative of various forms of idle durations during the associated cycle for the respective garbage collector thread 318. In some embodiments, the functionality described herein is distributed among a plurality of systems, which can include combinations of software and/or hardware-based systems, for example Application-Specific Integrated Circuits (ASICs), computer programs, or smart phone applications.

Figure 4:
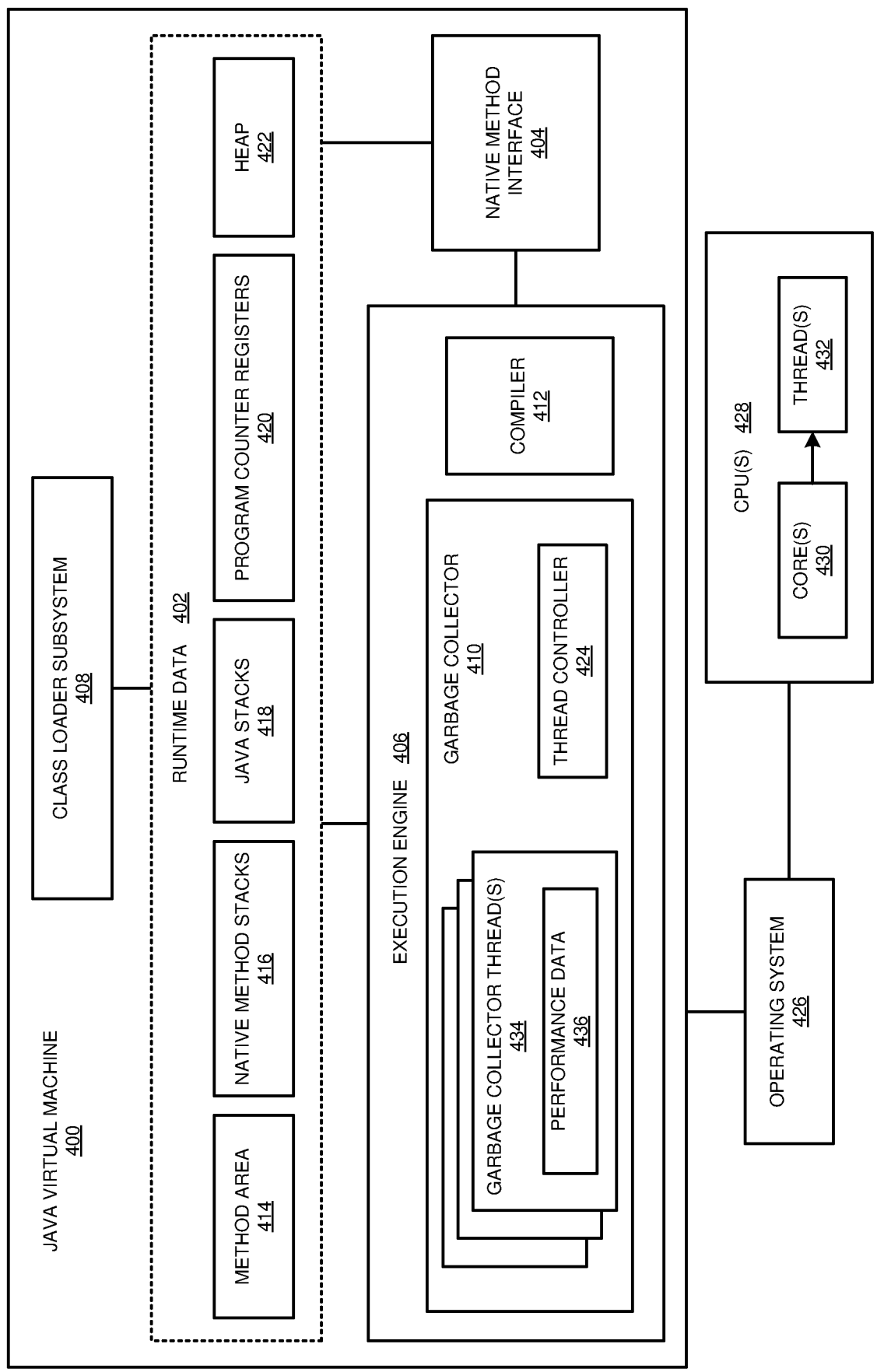
FIG. 4 depicts a block diagram of an example virtual machine or JVM in accordance with an illustrative embodiment.

With reference to FIG. 4, this figure depicts a block diagram of an example virtual machine or JVM 400 in accordance with an illustrative embodiment. The example embodiment includes a JVM 400, but alternative embodiments include other programming languages and corresponding architectures. In some embodiments, JVM 400 is an example of JVM 306 of FIG. 3. In some embodiments, JVM 400 performs processes according to the flowcharts shown in FIGS. 8-10.

In some embodiments, JVM 400 includes execution engine 406, native method interface 404, runtime data 402, and class loader subsystem 408. In some embodiments, the execution engine 406 includes a garbage collector 410 and a compiler 412. In some embodiments, the runtime data includes method area 414, native method stacks 416, Java stacks 418, program count registers 420, and heap 422. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the class loader subsystem 408 is a component of the JVM 400 that provides a mechanism for loading the types, which are classes and interfaces, using fully qualified names. In some embodiments, the runtime data 402 represents space in memory used to store data, including bytecode, information extracted from previously loaded class files, objects instantiated by an executing program, parameters provided to methods, return values associated with executing programs, and local variables associated with executing programs. In some embodiments, the runtime data 402 is organized into a number of runtime data area, such as method area 414, native method stacks 416, Java stacks 418, program count registers 420, and heap 422, although the organization of the memory can vary in alternative embodiments.

In some embodiments, execution engine 406 represents an execution component or processing component that provides a capability for executing the instructions contained in the methods of classes, loaded by class loader subsystem 408. In some embodiments, the native method interface 404 provide a capability to the virtual machine 400 to use native methods that are written using a Java programming language and have platform-specific data or processing requirements. In some embodiments, access to the native methods requires use of the native method interface 404 to enable processing using execution engine 406.

In some embodiments, compiler 412 is a runtime component providing a capability of dynamic translation, which is compilation during execution of a program rather than prior to the execution. In some embodiments, compiler 412 comprises an interpreter and/or just-in-time (JIT) compiler that translates the Java bytecode to platform specific machine code. In some embodiments, the run time compilation operates as a combination of ahead-of-time compilation (AOT) and interpretation.

In the illustrated embodiment, the garbage collector 410 includes a thread controller 424 for optimizing the number of garbage collector threads 434 used by the garbage collector 410. The garbage collector 410 performs a series of multithreaded process cycles. During each process cycle, the garbage collector 410 reviews current allocations of heap memory to identify particular objects in the heap memory that are in use and other particular objects in the heap memory that are not in use. During each process cycle, the garbage collector 410 also identifies objects not in use as candidates for removal and reclaims memory for such objects. Also during each process cycle, the garbage collector thread(s) 434 each collect performance data 436 during each cycle. In some embodiments, the performance data 436 includes data indicative of various forms of idle durations during the associated cycle for the respective garbage collector thread 434. In some embodiments, the garbage collector 410 performs these process cycles according to a predetermined schedule. Alternatively, in some embodiments, the garbage collector 410 automatically initiates a process cycle when heap usage exceeds a predetermined threshold.

In some embodiments, after the garbage collector 410 completes a process cycle, the thread controller 424 projects a more optimal thread count for the next process cycle that the garbage collector 410 will perform. In some such embodiments, the garbage collector 410 issues a query to a data storage for a thread-count recommendation determined as disclosed herein as a more optimal thread count. In some such embodiments, if the query returns an indication of the thread-count recommendation being available, the query response will include the thread-count recommendation, in which case the garbage collector 410 will then request the recommended number of threads for performing the process cycle. On the other hand, if the query returns an indication of the thread-count recommendation being unavailable, the garbage collector 410 will then request a default number of threads instead. In some such embodiments, the default number of threads is a predetermined number of threads or a predetermined percentage of available threads. For example, in some embodiments, if such a thread-count recommendation is not available, the garbage collector 410 will request all available threads (i.e., 100% of available threads).

In some embodiments, the garbage collector 410 receives an indication of a total number of available threads from an operating system 426. The total number of available threads will be some or all of the threads 432 that can be executed by one or more cores 430 of one or more CPUs 428. The garbage collector 410 will then request a number of threads, either based on a recommended thread count or a default thread count if a recommended thread count is unavailable, from among the threads 432.

Figure 5:
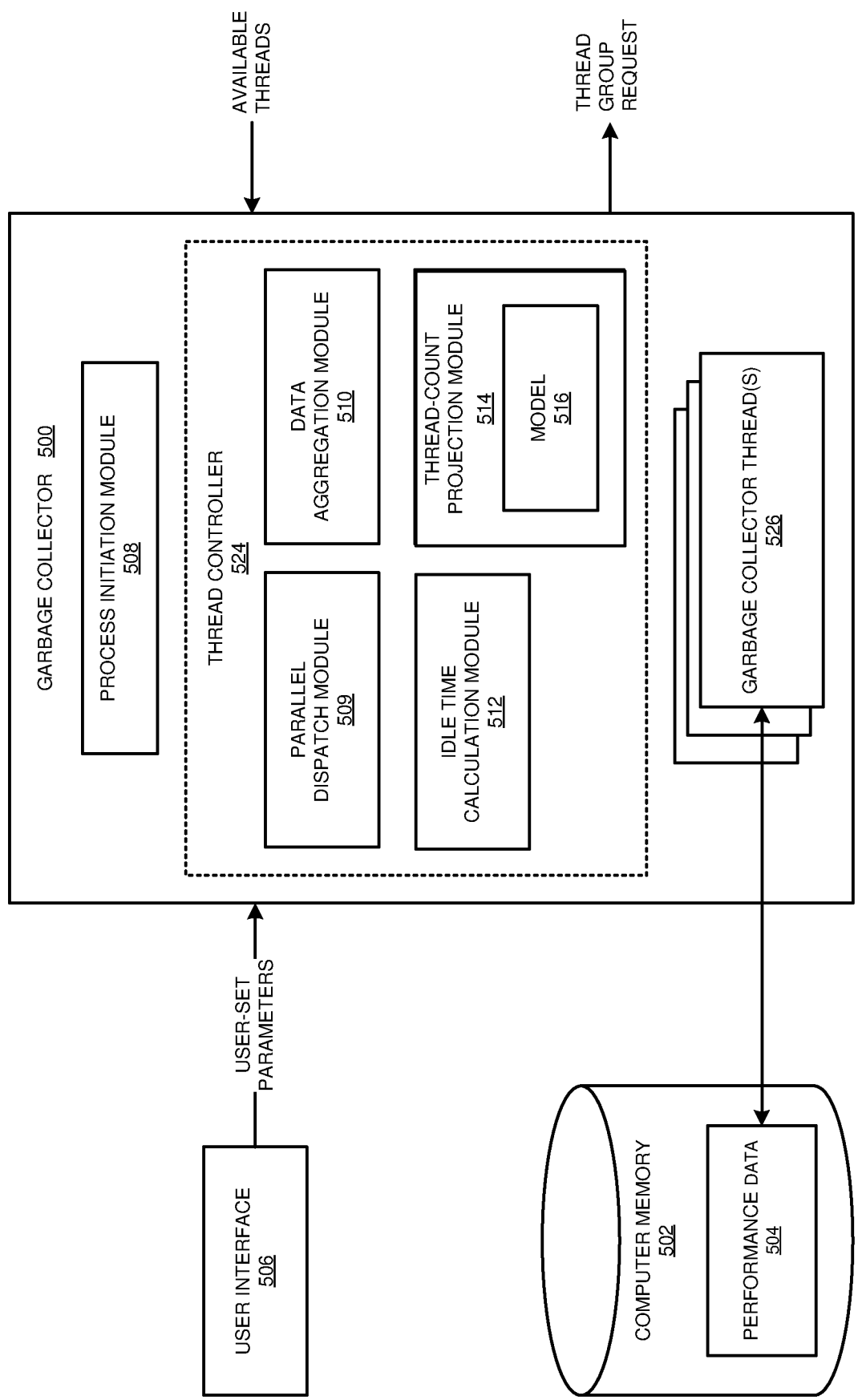
FIG. 5 depicts a block diagram of an example garbage collector in accordance with an illustrative embodiment.

With reference to FIG. 5, this figure depicts a block diagram of an example garbage collector 500 in accordance with an illustrative embodiment. The example embodiment includes a thread controller 524 that analyzes and improves thread count values for GC processes. In a particular embodiment, garbage collector 500 is an example of application 105A/105B of FIG. 1. In some embodiments, garbage collector 500 performs processes according to the flowcharts shown in FIGS. 8-10.

In some embodiments, the garbage collector 500 includes a process initiation module 508 and a thread controller 524, as well as other known garbage collector features not shown for the sake of clarity. The thread controller 524 includes a data aggregation module 510, an idle time calculation module 512, and a thread-count projection module 514 that includes a mathematical model 516. In alternative embodiments, the garbage collector 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

The process initiation module 508 is responsible for initiation the GC process cycles. In some embodiments, the process initiation module 508 initiates the GC process cycles according to a predetermined schedule. Alternatively, or additionally, in some embodiments, process initiation module 508 initiates GC process cycles automatically when heap usage exceeds a predetermined threshold.

In some embodiments, while initiating a GC process cycle, the process initiation module 508 invokes a parallel dispatch module 509 of the thread controller 524. The parallel dispatch module 509 will send a request to the operating system for some number of garbage collector threads 526 to perform the GC process cycle. For example, in some embodiments, the parallel dispatch module 509 requests a thread pool or worker pool for some number of garbage collector threads 526. The parallel dispatch module 509 determines the number of garbage collector threads 526 to request by first issuing a query to a computer memory 502 for a thread-count recommendation that was previously determined by the thread controller 524 according to disclosed embodiments. The parallel dispatch module 509 will also query the operating system for available threads for the next GC process cycle, and in response the operating system will provide a count of available threads. In some such embodiments, if the query returns an indication of the thread-count recommendation being available, the query response will include the thread-count recommendation, in which case the parallel dispatch module 509 will then request the recommended number of threads for performing the process cycle. On the other hand, if the query returns an indication of the thread-count recommendation being unavailable, the parallel dispatch module 509 will then request a default number of threads instead. In some such embodiments, the default number of threads is a predetermined number of threads or a predetermined percentage of available threads. For example, in some embodiments, if such a thread-count recommendation is not available, the parallel dispatch module 509 will request all available threads (i.e., 100% of available threads).

In some embodiments, the thread controller 524 is initiated at the end of each GC process cycle. In some embodiments, the data aggregation module 510 automatically aggregates performance data 504 collected by the garbage collector threads 526 while performing the most recent GC process cycle. The performance data 504 includes data indicative of various forms of idle durations, busy durations, and overall cycle duration. The performance data 504 also includes data indicative of thread-count insensitive durations, which are periods of time during which a thread is performing some action for which it is not possible or not worth parallelizing. In some embodiments, thread-count insensitive periods are discarded before projecting a more optimal thread count.

In some embodiments, the performance data 504 includes time stamps indicating when various actions or periods of activity or inactivity take place, so busy and idle durations are determined by calculating time periods between these recorded time stamps. In some embodiments, the data aggregation module 510 performs the data aggregation by iterating over the performance data 504 collected by each of the garbage collector threads 526, ignoring time periods in the performance data 504 during which the garbage collector threads 526 were busy, and instead collecting only information indicative of periods of time that constitute idle duration and collecting data indicative of the overall cycle duration.

In some embodiments, data aggregation module 510 provides the time stamp data for idle periods to the idle time calculation module 512. The idle time calculation module 512 calculates total idle time periods for respective garbage collector threads 526 while performing the most recent GC process cycle. The idle time calculation module 512 calculates each of the total idle time periods by summing the idle time periods recorded in the performance data 504 by each of the garbage collector threads 526 during the most recent GC process cycle. The idle time calculation module 512 then calculates an overall idle duration for the most recent GC process cycle by averaging the total idle time periods of all of the garbage collector threads 526. The idle time calculation module 512 then provides the overall idle duration to the thread-count projection module 514.

In some embodiments, the thread-count projection module 514 receives the overall idle duration from the idle time calculation module 512 and data indicative of the overall cycle duration from the data aggregation module 510. Upon receiving this data, the thread-count projection module 514 begins projecting a more optimal thread count value for the next GC process cycle.

In some embodiments, the thread-count projection module 514 calculates an overall busy duration for the most recent GC process cycle based on the overall cycle duration and the overall idle duration. The overall cycle duration is the total amount of time required for the garbage collector threads 526 to collectively perform the process cycle. Thus, in such embodiments, the thread-count projection module 514 calculates the busy duration as the difference between the overall cycle duration and the idle duration.

In some embodiments, the thread-count projection module 514 discard the thread-count insensitive periods (or thread-count insensitive durations) before projecting a more optimal thread count. In some such embodiments, the thread-count projection module 514 calculates busy duration by subtracting the idle duration and any thread-count insensitive durations from the overall cycle duration.

In some embodiments, the thread-count projection module 514 analyzes the aggregated performance data 504 using a mathematical model 516 that includes the idle duration from the most recent GC process cycle as an input idle duration to the mathematical model and a revised thread count for the next GC process cycle as an output variable of the mathematical model. In some such embodiments, the output variable is representative of an output number of garbage collector threads 526, and the output number of garbage collector threads 526 is determined as a function of the input idle duration using the mathematical model.

In some embodiments, the mathematical model includes a weighting factor that affects a difference between the number of garbage collector threads 526 used for the most recent GC process cycle and the output number of garbage collector threads 526. In some embodiments, the mathematical model includes a boosting factor that affects a proportionality between the number of garbage collector threads 526 used for the most recent GC process cycle and the difference between the number of garbage collector threads 526 used for the most recent GC process cycle and the output number of garbage collector threads 526. In some embodiments, the mathematical model includes a sensitivity factor that affects the output number of garbage collector threads 526 based on one or more platform-specific characteristics. For example, in some such embodiments, the platform-specific characteristic affects idle time for garbage collector threads 526 of a GC process cycle. In some embodiments, the mathematical model further includes an overall cycle duration from the most recent process cycle as an input cycle duration to the mathematical model and includes the number of garbage collector threads 526 from the most recent process cycle as an input number of garbage collector threads 526 to the mathematical model. In some such embodiments, the output number of garbage collector threads 526 is determined by the mathematical model as a function of the input idle duration, the input cycle duration, and the input number of garbage collector threads 526.

In some embodiments, the mathematical model 516 can be expressed mathematically as a continuous function that takes a set of inputs and projects a more optimal number of garbage collector threads 526 to be used. A good model is one that can accurately determine efficiency of a cycle and predict a more optimal GC thread count based on current or most recently used number of garbage collector threads 526, includes a component that varies directly in relation to overall busy duration, and includes a component that varies inversely relation to overall idle duration. In some embodiments, the mathematical model 516 is derived by finding a minimum of the time function shown as Expression 8:

$$\text{Time}(m,n,b,s) = b*(n/m) + s*(m/n)^X \qquad (8)$$

In Expression 8, Time refers to the overall cycle duration (minus the thread-count insensitive durations), m is representative of the projected more optimal thread count, n is representative of the number of garbage collector threads 526 used for the most recent process cycle, b is representative of the average busy time per thread (also referred to as overall busy duration), s is representative of the average idle time per thread (also referred to as overall idle duration), and X is representative of a model constant for a sensitivity factor.

In some embodiments, the mathematical model 516 is a combination of Expressions 9 and 10 as follows:

$$m(n,b,s)=n^{*x+1}\sqrt{b/(X+s)} \qquad (9)$$

$$RT=[((m(n,b,s)+H)*(1-W))+(n*W)] \qquad (10)$$

In Expression 10, RT is representative of the more optimal thread count value to recommend for the next GC process cycle, W is representative of a weighting factor, and H is representative of a boosting factor. Expression 9 is derived from Expression 8 based on solving for minimal Time. Expression 10 takes the result from Expression 9 and applies weighting and boosting factors to arrive at a more optimal thread count value to recommend for the next GC process cycle.

The weighting factor W is based the importance given to the number of utilized garbage collector threads 526 for the most recent process cycle when averaging with the projected optimal thread count. This controls responsiveness to dynamic threading by controlling how the model transitions from the most recent thread count to the more optimal thread count. In other words, the weighting factor describes how much to resist or respect the projected thread count. For instance, a high value for the weighting factor W would translate to resisting recommended thread counts as most recently used thread counts are given more importance.

The boosting factor H is used to boost the calculated more optimal thread count. The boosting factor gives opportunity for a low thread count to grow as low thread counts tend to be stagnated from growing. The boosting factor is not significant with large thread counts (e.g., n greater than 5), however it will begin to have more of an effect when the number of most recently used threads is less than 5 (e.g., n in a range of 1 to 5).

The sensitivity factor X determines the aggressiveness of the model. The sensitivity factor is used to configure sensitivity to overhead. A higher number translates to more sensitivity to overhead, and thus more aggressive adjustments. In some embodiments, a linear dependency of idle time on thread count yields satisfactory results, which translates to setting X to 1. The sensitivity factor X can be adjusted based on application or platform-specific behavioral characteristics that determine stall dependency on GC thread count. For instance, if stall times are known to have a non-linear dependency on GC thread count, then the sensitivity factor X can be adjusted accordingly. A smaller value for the sensitivity factor X (e.g., X=0.9) can be tried when dependency between stall time and thread count is not as significant, which can be true for some platforms that have optimizations in place for multithreading. On the other hand, a larger value for the sensitivity factor X (e.g., X=1.2) can be used where there is a greater dependency between stall and GC thread count, thus more aggressive adjustments are required for the same stall.

In some embodiments, the thread-count projection module 514 project the more optimal thread count using parameters for one or more of the weighting factors, the boosting factor, and the sensitivity factor that are based on stored default values. In such embodiments, the thread-count projection module 514 projects the more optimal thread count automatically without requiring user action. In alternative embodiments, the mechanisms automatically aggregate and analyze the collected performance data 504 and semi-automatically project a more optimal thread count for a subsequent cycle of the process by allowing a user to input parameters via a user interface 506 for one or more of the weighting factor, the boosting factor, and the sensitivity factor or allowing a user to adjust one or more settings via the user interface 506 that the thread-count projection module 514 uses as a basis for parameters for one or more of the weighting factor, the boosting factor, and the sensitivity factor.

Figure 6:
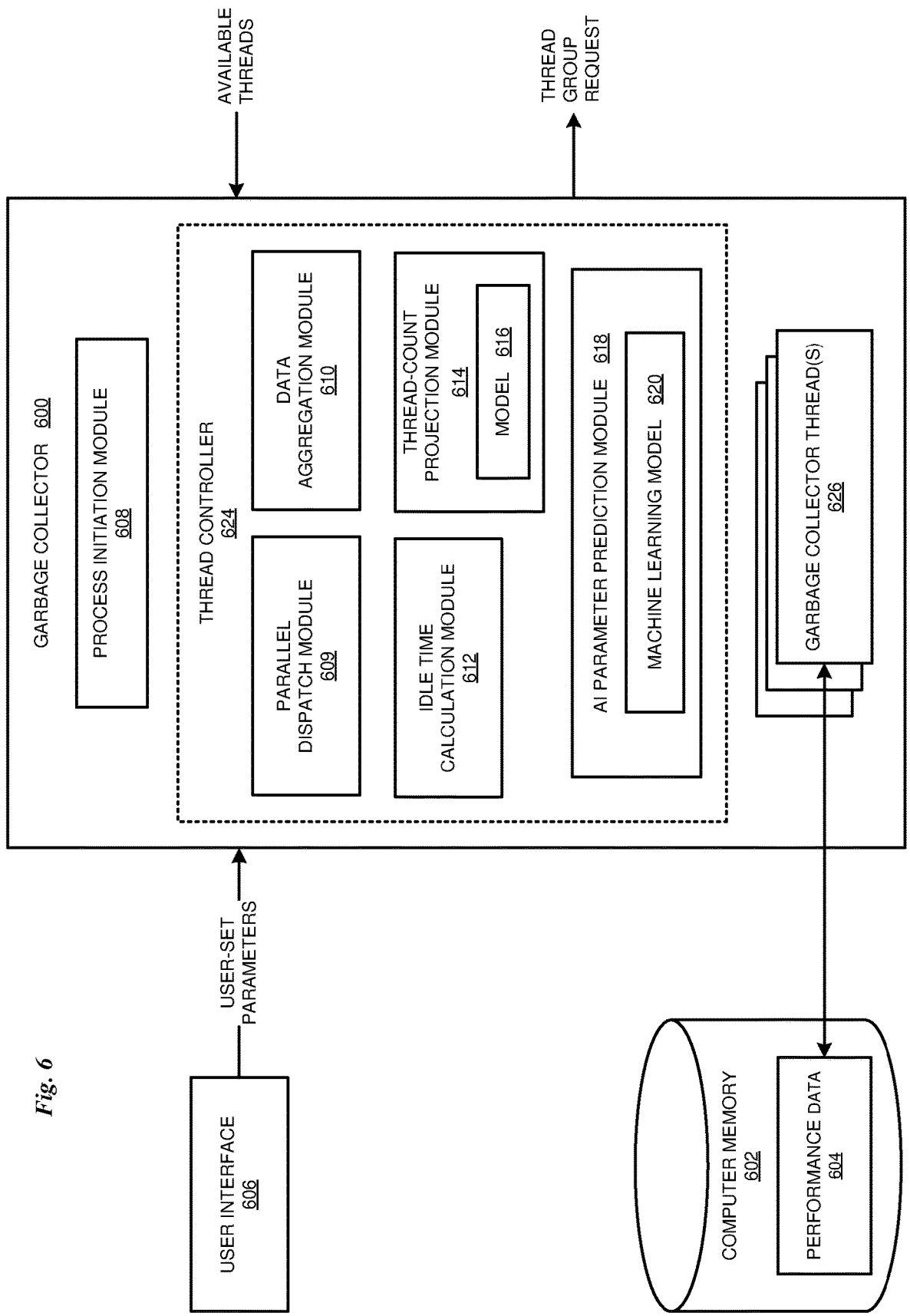
FIG. 6 depicts a block diagram of an example garbage collector in accordance with an alternative illustrative embodiment.

With reference to FIG. 6, this figure depicts a block diagram of an example garbage collector 600 in accordance with an illustrative embodiment. The example embodiment includes a thread controller 624 that analyzes and improves thread count values for GC processes. In a particular embodiment, garbage collector 600 is an example of application 105A/105B of FIG. 1. In some embodiments, garbage collector 600 performs processes according to the flowcharts shown in FIGS. 8-10.

The illustrated embodiment of the garbage collector 600 is similar to the embodiment of the garbage collector 500 shown in FIG. 5, except for the differences discussed below. Thus, the descriptions of the process initiation module 508, parallel dispatch module 509, thread controller 524, data aggregation module 510, idle time calculation module 512, thread-count projection module 514, mathematical model 516, and garbage collector threads 526 of FIG. 5 apply equally to the process initiation module 608, parallel dispatch module 609, thread controller 624, data aggregation module 610, idle time calculation module 612, thread-count projection module 614, mathematical model 616, and garbage collector threads 626 respectively, of FIG. 6.

In the illustrated embodiment, the garbage collector 600 further includes an artificial intelligence (AI) parameter prediction module 618, which includes a machine learning model 620. In such embodiments, the thread controller 624 automatically aggregates and analyzes the collected performance data 604 from the computer memory 602 and automatically projects a more optimal thread count for a subsequent cycle of the GC process without requiring user input or any other user action. In some such embodiments, the thread controller 624 projects the more optimal thread count using one or more parameters that are determined by the AI parameter prediction module 618 using a machine learning process.

For example, in some such embodiments, the AI parameter prediction module 618 determines a weighting parameter for the weighting factor using a machine learning model 620 that is trained to predict the weighting parameter based on features of previously-collected performance data of several previously-performed GC process cycles. The AI parameter prediction module 618 determines the weighting parameter by executing the trained machine learning model 620 using the performance data 604 collected during a most recent cycle of a process to predict a weighting parameter for projecting a more optimal thread count for the next cycle of the process.

In some such embodiments, the AI parameter prediction module 618 determines a boosting parameter for the boosting factor using a machine learning model 620 that is trained to predict the boosting parameter based on features of previously-collected performance data of several previously-performed GC process cycles. The AI parameter prediction module 618 determines the boosting parameter by executing the trained machine learning model 620 using the performance data 604 collected during a most recent cycle of a process to predict a boosting parameter for projecting a more optimal thread count for the next cycle of the process.

In some embodiments, the thread controller 624 semi-automatically aggregates and analyzes the collected performance data 604 from the computer memory 602 and projects a more optimal thread count for a subsequent cycle of the GC process. In some such embodiments, the thread controller 624 projects the more optimal thread count using one or more parameters that are determined by the AI parameter prediction module 618 using a machine learning process and one or more parameters that are input by a user via the user interface 606 for one or more of the weighting factor, the boosting factor, and the sensitivity factor and/or based on settings provided by the user via the user interface 606 that the thread-count projection module 614 uses as a basis for parameters for one or more of the weighting factor, the boosting factor, and the sensitivity factor.

Figure 7:
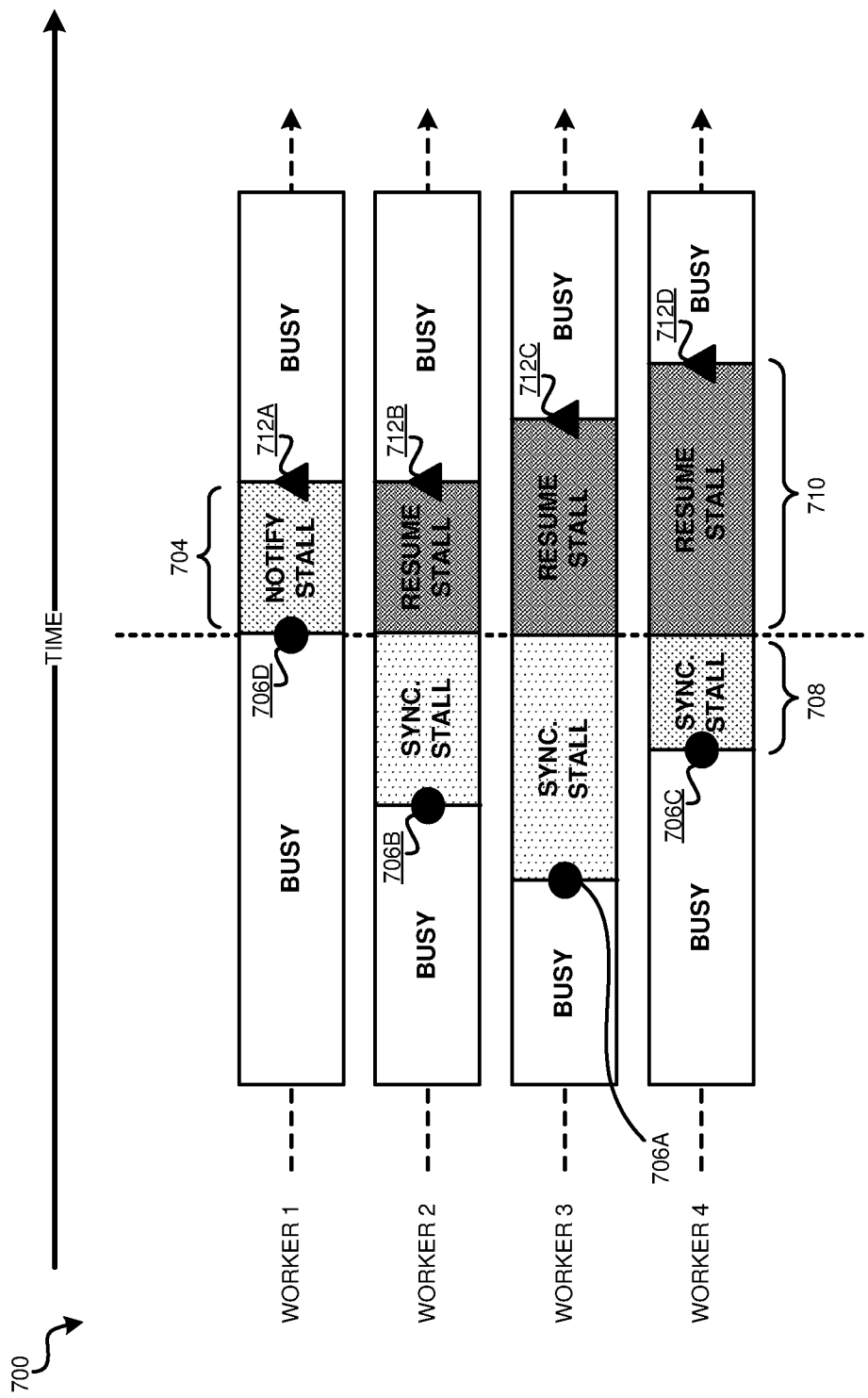
FIG. 7 depicts a block diagram of a synchronization scenario for a plurality of threads performing a portion of a multithreading process in accordance with an illustrative embodiment.

With reference to FIG. 7, this figure depicts a block diagram of a synchronization scenario 700 for a plurality of threads performing a portion of a multithreading process in accordance with an illustrative embodiment. The example embodiment includes a horizontal axis that represents time, and a plurality of threads designated WORKER1 to WORKER4 distributed in a vertical direction parallel operation of the threads along a single timeline. In a particular embodiment, the synchronization scenario 700 is part of a GC process cycle performed by the garbage collector 500 of FIG. 5 or by the garbage collector 600 of FIG. 6.

In some embodiments, stall or idle times occur as shown in the synchronization scenario 700. In the scenario 700, the threads reach a synchronization point (706A-706D, collectively 706) where they must wait (suspend) until all other running threads have also reached the synchronization point 706. In the illustrated embodiment, the WORKER3 thread is the first thread to reach its synchronization point 706A, followed by WORKER2 at synchronization point 706B, then WORKER4 at synchronization point 706C, and finally WORKER1 at synchronization point 706D. The last thread to reach the synchronization point 706 (WORKER1) then notifies all the suspended threads to "wake up" so that they can continue on with useful work related to the assigned process. The time spent waiting at a synchronization point 706 ("SYNC STALL"), for example time span 708 for WORKER4, and the time spent performing the notify ("NOTIFY STALL"), for example time span 704 for WORKER1, are both considered stall times and are included in the idle duration. The threads are either idle or doing non-useful work during these times, so therefore these times are measured and included in the idle duration.

When excessive (i.e., more than optimal) threads are utilized, the SYNC STALL and NOTIFY STALL times tend to be greater than the busy durations. For instance, if there is not much work to be distributed to a thread during root scanning, the thread will quickly exhaust its work and wait at a synchronization point 706. Furthermore, parallelization overhead is made evident by the fact that suspended threads do not instantaneously start up after the last thread reaches the synchronization point 706. Instead, the threads remain idle because it takes a non-negligible amount of time for the threads to receive the notification that all threads have reached the synchronization point 706, wake up (re-acquire monitor), and run. Additionally, the last thread takes a non-negligible amount of time to perform the notification ("NOTIFY STALL" from WORKER1). Hence, the threads are still stalled ("RESUME STALL") even after all threads have reached the synchronization point 706. For example, WORKER4 remains stalled for a time span 710 after all threads have reached the synchronization point 706, where the time span 710 for the RESUME STALL is significantly longer than the time span 708 for the SYNC STALL. In other words, even though threads are allowed to continue and do useful work, they are still stalled. Threads exit the synchronization point at various times. As shown in FIG. 7, one thread may exit the stall period much later than another. For example, the WORKER1 thread wakes up (re-acquires monitor) upon completing the notification at exit point 712A. The WORKER2 receives the notification and wakes up fairly early (re-acquires monitor) at exit point 712B. The WORKER3 receives the notification and wakes up next at exit point 712C, followed by the WORKER4, which receives the notification and wakes up at exit point 712D. Upon waking up, the threads exit the synchronization point and start preforming useful GC work, even sometimes while other threads are still in the process of waking up.

Thus, there are several types of stalls that have distinctive characteristics and varying dependency on utilized threads. Therefore, a distinction can be made between them. For example, the SYNC STALL (idle waiting for threads to synchronize) and RESUME STALL (overhead to resume threads, also includes notify stall) durations respond differently to changes to the thread count in scenarios where the thread count is relatively small (e.g., $n \leq 5$) or relatively large (e.g., $n > 5$).

Overhead to resume threads (RESUME STALL) is mostly dependent on Operating System processes and is platform/architecture dependent (scheduling threads to get into running state, reacquiring monitor after waking up, etc.). As a result, the RESUME STALL overhead is more difficult to model. However, but unlike SYNC STALL, the RESUME STALL durations are more sensitive to n for relatively larger thread counts (e.g., $n > 5$) due to serialization and contention created when all threads want to reacquire monitor after waking up.

On the other hand, SYNC STALL is mostly a consequence of parallel work being done in units of work that are non-arbitrarily small (although some overhead can come from contention of acquiring monitor just before waiting). If it takes Tunit time to process one unit of work, n−1 threads will be idle for average Tunit/2 time before the last (nth) thread reaches the synchronization point 706. Average wait time per thread is then Tunit/2*(n−1)/n. This is sensitive to thread count n, only if thread count n is small (e.g., $n \leq 5$), but almost insensitive to thread count n when thread count n is large (10s of threads), since the (n−1)/n component of the average wait time per thread approaches 1 as thread count n approaches infinity according to Expression 11:

$$\lim_{n \to \infty} \left( \frac{n-1}{n} \right) = 1 \tag{11}$$

While the SYNC STALL and RESUME STALL durations could be treated separately in a heuristic for calculation of optimal thread counts, in practice they tend to complement each other well, so in some embodiments, they are unified into a single stall time and treated as if they were the same type of stall time, i.e., as part of the idle duration.

Figure 8:
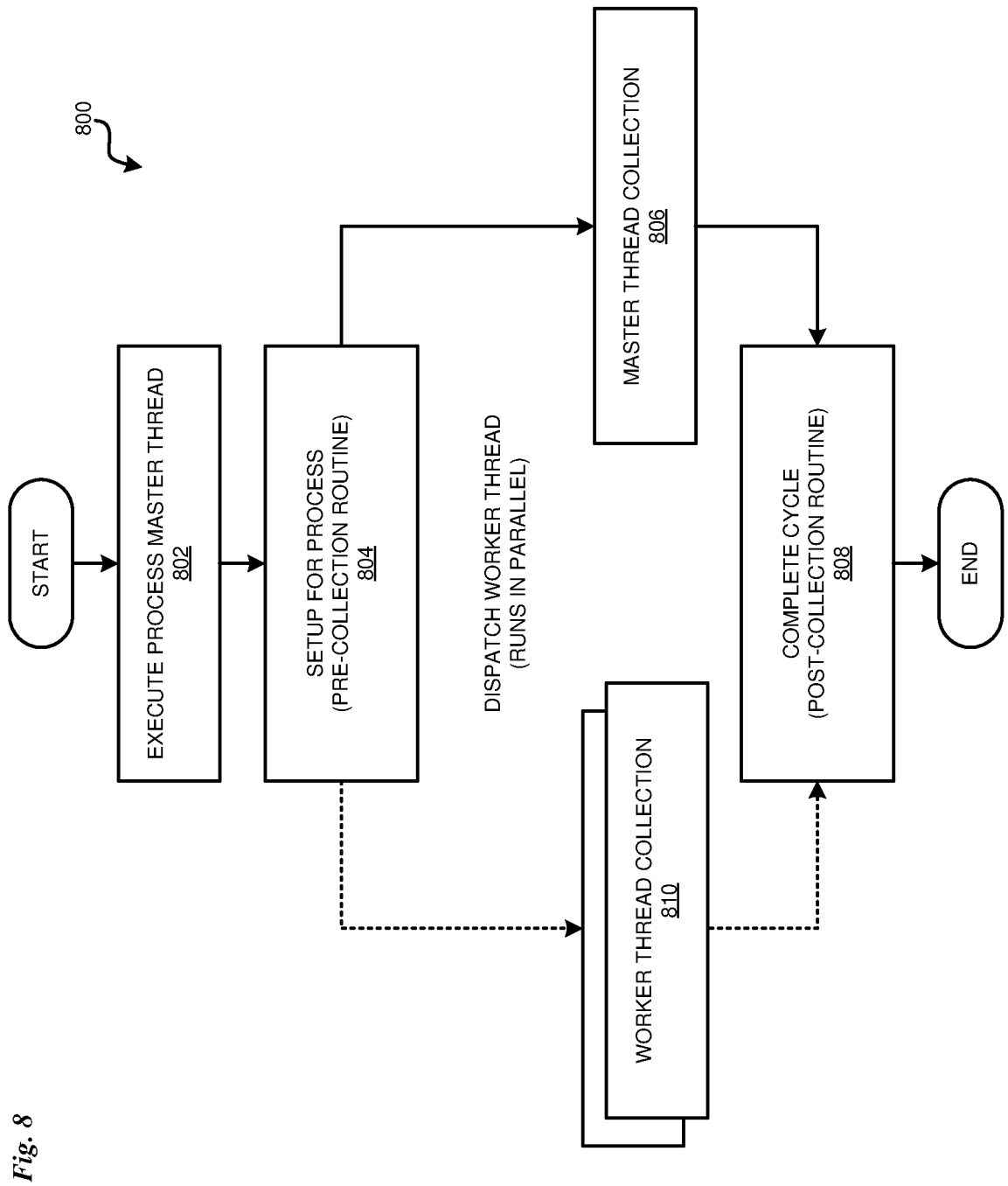
FIG. 8 depicts a high-level flowchart of an example cycle of a process that includes thread count optimization in accordance with an illustrative embodiment.

With reference to FIG. 8, this figure depicts a high-level flowchart of an example cycle of a process 800 that includes thread count optimization in accordance with an illustrative embodiment. The process 800 includes a pre-collection routine 804 and a post-collection routine 808. In some embodiments, the process 900 of FIG. 9 is an example of the pre-collection routine 804, and the process 1000 of FIG. 10 is an example of the post-collection routine 808.

In an embodiment, at block 802, upon initiation of the process cycle, a master thread is the first thread to execute (and the last thread to finish). The master thread is responsible for managing the process cycle in addition to taking part in collecting performance data and performing task associated with the assigned process (e.g., GC-related tasks for a GC process cycle). As part of managing the process cycle, at block 804 the master thread performs pre-collection tasks at block 804 before the worker threads start at block 810. At block 810, which represents the time span during which worker threads are performing the assigned process, occurs timewise in parallel with block 806, during which the master thread is also performing tasks associated with the assigned process just as if it were a worker thread. At blocks 806 and 810, the master thread and each of the worker threads are also recording respective performance datasets in memory, for example by recording time stamps at transition points between busy and idle times. Once the process cycle is complete, the process 800 continues to block 808 where the master thread performs a post-collection routine. At block 808 the master thread performs post-collection tasks after all worker threads have suspended. Block 804 is described in greater detail below with reference to FIG. 9 and block 808 is described in greater detail below with reference to FIG. 10.

Figure 9:
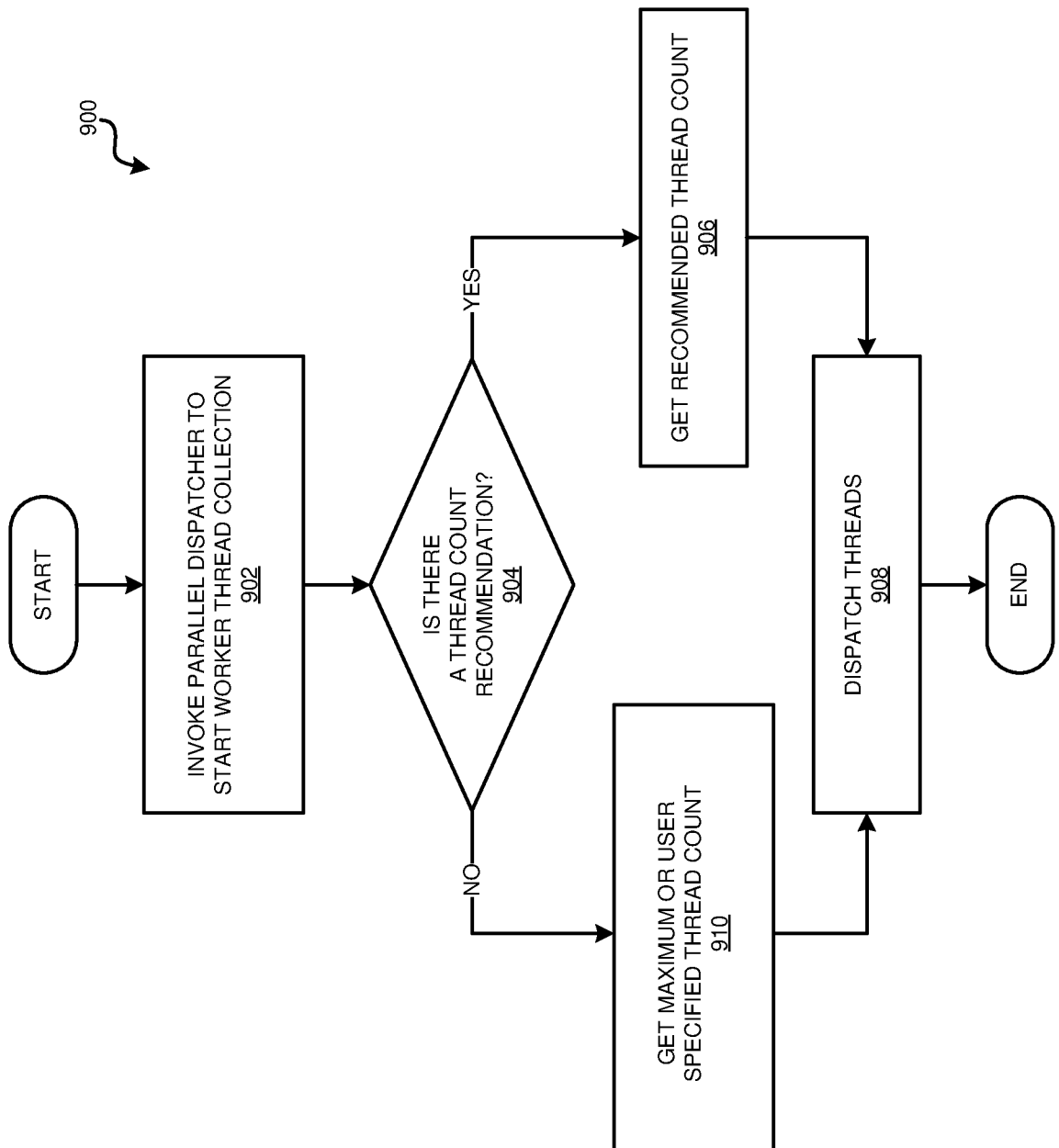
FIG. 9 depicts a high-level flowchart of an example pre-collection process in accordance with an illustrative embodiment.
Figure 10:
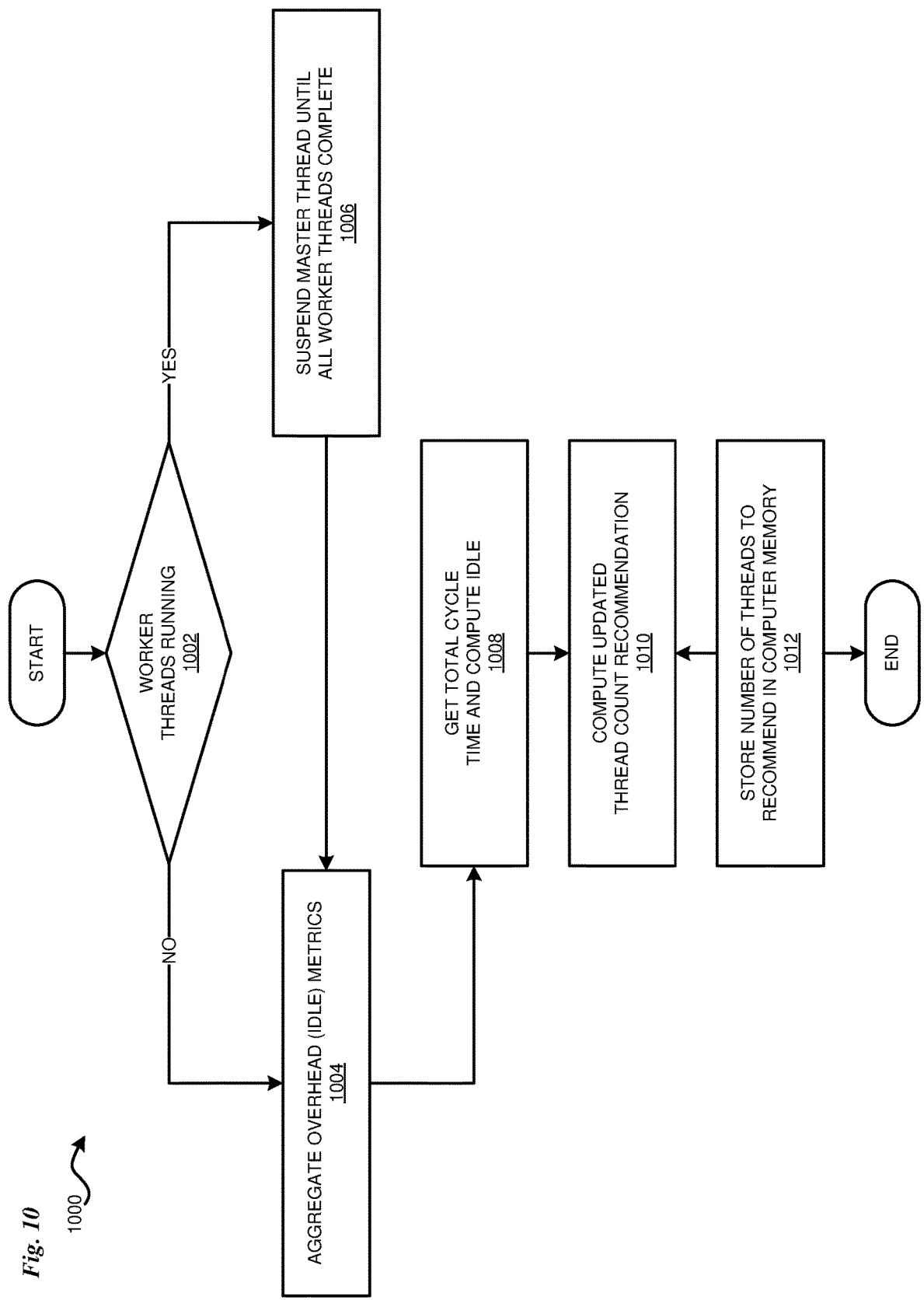
FIG. 10 depicts a high-level flowchart of an example post-collection process in accordance with an illustrative embodiment.

With reference to FIG. 9, this figure depicts a high-level flowchart of an example pre-collection process 900 in accordance with an illustrative embodiment. The pre-collection process 900 is an example of the pre-collection routine 804 of FIG. 8.

In some embodiments, at block 902, the master thread invokes a parallel dispatch module to start worker thread collection. For example, in some embodiments, the master thread issues a query to an operating system to determine the number of available threads, and begins to prepare a thread pool request. At block 904, the master thread issues a query to a data storage for a thread-count recommendation determined as disclosed herein as a more optimal thread count. In some embodiments, if the query returns an indication of the thread-count recommendation being available ("YES" from block 904), the process continues to block 906 where the master thread receives the thread-count recommendation with the query response. The process then continues to block 908 where the master thread issues the thread pool request for the recommended number of threads.

On the other hand, at block 904, if the query returns an indication of the thread-count recommendation being unavailable ("NO" from block 904), the process continues to block 910 where the master thread determines the maximum number of available threads. In some embodiments, master thread determines the maximum number of available threads based on a response by the operating system to the available-threads query issued by the master thread at block 902. In alternative embodiments, at block 910 the master thread will determine a default number of threads to request instead. In some such embodiments, the default number of threads is a predetermined number of threads or a predetermined percentage of available threads. For example, in some embodiments, if a thread-count recommendation is not available, the master thread requests all available threads (i.e., 100% of available threads). The process then continues to block 908 where the master thread issues the thread pool request for the number of threads determined at block 910 to start execution. i.e., the worker threads start whereby the process becomes parallelized (multithreaded).

With reference to FIG. 10, this figure depicts a high-level flowchart of an example post-collection process 1000 in accordance with an illustrative embodiment. The post-collection process 1000 is an example of the post-collection routine 808 of FIG. 8.

In the illustrated embodiment, at block 1002, the master thread determines if any of the worker threads are still running. If so, then at block 1006 the master thread goes into a suspended state until all of the worker threads are complete. Once all worker threads are complete, or if no worker threads are running at block 1002, the process continues to block 1004, where the process includes aggregating the performance data collected during the process cycle by the master thread and each of the worker threads (at blocks 806 and 810 of FIG. 8). In some embodiments, the aggregating of the performance data comprises includes iterating over the data collected by each of the master and worker threads and calculating respective individual idle times for each of the master and worker threads, where the individual idle times include amounts of time that the respective threads were idle. Next, at block 1008, the process collects the total cycle time for the just-completed process cycle. The process also calculates stall and other non-productive time spans that contribute to idle durations of each of the threads. The process then computes an idle duration for the just-completed process by calculating an average of the individual idle times of the master and worker threads. Next, at block 1010, the process projects a thread-count recommendation. In some embodiments, the process projects the thread-count recommendation using a mathematical model that includes the idle duration from block 1008 as an input idle duration to the mathematical model and a number of threads for the thread-count recommendation as an output variable of the mathematical model. The output variable is representative of an output number of threads, and the output number of threads is determined as a function of the input idle duration using the mathematical model. In some embodiments, the mathematical model further includes a duration of the just-completed cycle as an input cycle duration to the mathematical model and further includes the total number of threads (master thread+worker threads) as an input number of threads to the mathematical model. In some such embodiments, the output number of threads is determined by the mathematical model as a function of the input idle duration, the input cycle duration, and the input number of threads.

In some embodiments, the mathematical model further includes a weighting factor that affects a difference between the number of threads used for the just-completed cycle and the output number of threads. In some embodiments, the mathematical model further includes a boosting factor that affects a proportionality between the number of threads used for the just-completed cycle and the difference between the number of threads used for the just-completed cycle and the output number of threads. In some embodiments, the process includes determining a parameter for at least one of the weighting factors and the boosting factor of the mathematical model using a machine learning algorithm that is trained based on features of historical performance data to predict the parameter. In such embodiments, the process determines the parameter by executing the trained machine learning algorithm. In some embodiments, the mathematical model includes a sensitivity factor that affects the output number of threads based on a platform-specific characteristic that affects idle time for threads of the garbage collection process.

Next, at block 1012, the process stores the output number of threads from block 1010 as a recommended thread count in a computer memory. The process stores the recommended thread count in a local or remote computer-readable memory where it can be retrieved as a recommended thread count during a next iteration of the process cycle (at block 906 of FIG. 9).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit an exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method, comprising:
    initiating a first cycle of a process using a first number of threads,
    wherein the first number of threads operate in parallel during the first cycle to collectively execute the process, and
    wherein each of the first number of threads collects performance data during the first cycle;
    aggregating the performance data collected during the first cycle by each of the first number of threads;
    computing a first idle duration based at least in part on the aggregated performance data,
    wherein the first idle duration is based on an average of respective total idle times of each of the first number of threads of the first cycle;
    projecting a thread-count recommendation based at least in part on a mathematical model that includes the first number of threads as an input number of threads to the mathematical model, the first idle duration from the first cycle as an input idle duration to the mathematical model, a first cycle duration of the first cycle as an input cycle duration to the mathematical model, and a second number of threads as an output variable of the mathematical model,
wherein the output variable is representative of an output number of threads, and
wherein the output number of threads is determined as a function of the input idle duration using the mathematical model; and
initiating a second cycle of the process using the second number of threads projected by the mathematical model as the output number of threads,
wherein the second number of threads operate in parallel during the second cycle to collectively execute the process.

2. The computer-implemented method of claim 1, further comprising issuing a query to a data storage for a thread-count recommendation.

3. The computer-implemented method of claim 2, further comprising specifying, responsive to the query returning an indication of the thread-count recommendation being unavailable, a total amount of available threads as the first number of threads.

4. The computer-implemented method of claim 2, further comprising specifying, responsive to the query returning a recommended number as the thread-count recommendation, the recommended number of available threads as the first number of threads.

5. The computer-implemented method of claim 1, wherein a total idle time of a specific thread (thread-A) is a summation of all such durations within a specific cycle (cycle-A) of a specific process (process-A) assigned to the thread-A during which the thread-A is not engaged in performing an action related to the process-A.

6. The computer-implemented method of claim 1, wherein the mathematical model further includes a weighting factor that affects a difference between the first number of threads used for the first cycle and the output number of threads.

7. The computer-implemented method of claim 6, wherein the mathematical model further includes a boosting factor that affects a proportionality between the first number of threads used for the first cycle and the difference between the first number of threads and the output number of threads.

8. The computer-implemented method of claim 7, determining, by a processor, a parameter for at least one of the weighting factors and the boosting factor of the mathematical model for the second cycle of the process,
wherein a machine learning algorithm is trained based on features of the performance data to predict the parameter,
wherein the determining is performed by executing the trained machine learning algorithm, and
wherein the features can be uniformly used from different datasets of performance data from respective cycles of the process in training the machine learning algorithm to predict the parameter for a respective different cycle of the process.

9. The computer-implemented method of claim 1, wherein:
the process is a garbage collection process that deletes unused objects from memory;
the mathematical model further includes a sensitivity factor that affects the output number of threads based on a platform-specific characteristic; and
the platform-specific characteristic affects idle time for threads of the garbage collection process.

10. The computer-implemented method of claim 1, wherein the output number of threads is determined by the mathematical model as a function of the input idle duration, the input cycle duration, and the input number of threads.

11. The computer-implemented method of claim 1, wherein the aggregating of the performance data comprises:
iterating over data collected by each of the first number of threads; and
calculating respective individual idle times for each of the first number of threads,
wherein an individual idle time of a specific thread includes a total amount of time that the specific thread was idle.

12. The computer-implemented method of claim 11, wherein the computing of the first idle duration comprises calculating an average of the individual idle times of the first number of threads.

13. A computer usable program product for dynamic threading, the computer program product comprising one or more computer readable storage media, and program instructions collectively stored on the one or more computer readable storage media, the program instructions executable by a processor to cause the processor to perform operations comprising:
initiating a first cycle of a process using a first number of threads,
wherein the first number of threads operate in parallel during the first cycle to collectively execute the process, and
wherein each of the first number of threads collects performance data during the first cycle;
aggregating the performance data collected during the first cycle by each of the first number of threads;
computing a first idle duration based at least in part on the aggregated performance data,
wherein the first idle duration is based on an average of respective total idle times of each of the first number of threads of the first cycle;
projecting a thread-count recommendation based at least in part on a mathematical model that includes the first number of threads as an input number of threads to the mathematical model, the first idle duration from the first cycle as an input idle duration to the mathematical model, a first cycle duration of the first cycle as an input cycle duration to the mathematical model, and a second number of threads as an output variable of the mathematical model,
wherein the output variable is representative of an output number of threads, and
wherein the output number of threads is determined as a function of the input idle duration using the mathematical model; and
initiating a second cycle of the process using the second number of threads,
wherein the second number of threads operate in parallel during the second cycle to collectively execute the process.

14. The computer usable program product of claim 13, wherein the stored program instructions are stored in a computer readable storage device in a data processing system, and wherein the stored program instructions are transferred over a network from a remote data processing system.

15. The computer usable program product of claim 13, wherein the stored program instructions are stored in a computer readable storage device in a server data processing system, and wherein the stored program instructions are downloaded over a network to a remote data processing system for use in a computer readable storage device associated with the remote data processing system, further comprising:

program instructions to meter use of the computer usable code associated with the request; and program instructions to generate an invoice based on the metered use.

16. The computer usable program product of claim 13, wherein the mathematical model further includes a weighting factor that affects a difference between the first number of threads used for the first cycle and the output number of threads.

17. The computer usable program product of claim 16, wherein the mathematical model further includes a boosting factor that affects a proportionality between the first number of threads used for the first cycle and the difference between the first number of threads and the output number of threads.

18. The computer usable program product of claim 13, wherein the mathematical model further includes a sensitivity factor that affects the output number of threads based on platform-specific characteristics.

19. A computer system comprising a processor and one or more computer readable storage media, and program instructions collectively stored on the one or more computer readable storage media, the program instructions executable by the processor to cause the processor to perform operations comprising:

initiating a first cycle of a process using a first number of threads, wherein the first number of threads operate in parallel during the first cycle to collectively execute the process, and wherein each of the first number of threads collects performance data during the first cycle;

aggregating the performance data collected during the first cycle by each of the first number of threads;

computing a first idle duration based at least in part on the thus aggregated performance data, wherein the first idle duration is based on an average of respective total idle times of each of the first number of threads of the first cycle;

projecting a thread-count recommendation based at least in part on a mathematical model that includes the first number of threads as an input number of threads to the mathematical model, the first idle duration from the first cycle as an input idle duration to the mathematical model, a first cycle duration of the first cycle as an input cycle duration to the mathematical model, and a second number of threads as an output variable of the mathematical model, wherein the output variable is representative of an output number of threads, and wherein the output number of threads is determined as a function of the input idle duration using the mathematical model; and initiating a second cycle of the process using the second number of threads, wherein the second number of threads operate in parallel during the second cycle to collectively execute the process.

20. The computer system of claim 19, wherein:

the mathematical model further includes a weighting factor that affects a difference between the first number of threads used for the first cycle and the output number of threads; and the mathematical model further includes a boosting factor that affects a proportionality between the first number of threads used for the first cycle and the difference between the first number of threads and the output number of threads.

* * * * *